United States Patent [19]

Naka

[11] 3,989,296
[45] Nov. 2, 1976

[54] SADDLE
[76] Inventor: Yukio Naka, No. 1070, Tsuruhara, Izumisano, Osaka, Japan
[22] Filed: Apr. 23, 1975
[21] Appl. No.: 570,814

[30] Foreign Application Priority Data
June 3, 1974 Japan .............................. 49-164459
June 3, 1974 Japan .............................. 49-64458

[52] U.S. Cl. ................................ 297/209; 297/215
[51] Int. Cl.² ............................................ B62J 1/02
[58] Field of Search ........... 297/195, 215, 214, 204, 297/209, 196, 208

[56] References Cited
UNITED STATES PATENTS
525,190   8/1894   Devore ................................ 297/215
1,358,315  11/1920  Joel ..................................... 297/215
1,518,157  12/1924  Linder ................................. 297/215
1,851,973   4/1932  Brandt ................................. 297/209

Primary Examiner—Ramon S. Britts
Assistant Examiner—Darrell Marquette
Attorney, Agent, or Firm—George B. Oujevolk

[57] ABSTRACT

A saddle for a bicycle and the like elastically mounted on the bicycle so as to provide a suitable cushioning effect thereon. This saddle has at the back side thereof a twisted wire consisting of a plural number of wires wound around each other, each wire being preferably as resilient as possible, said twisted wire fixing said saddle to the seatpost of the vehicle so as to provide a suitable cushioning effect and comfortable sitting thereon.

2 Claims, 4 Drawing Figures

SADDLE

This invention relates to a saddle for a bicycle and the like and in particular a saddle elastically fixed to the bicycle by means of a twisted wire so as to provide a cushioning effect and accordingly comfortable sitting on said saddle.

Conventional saddles of this kind lack cushioning effect due to insufficiency in elasticity of corresponding wires. Usually used for this is a single, suitably thick wire in a twofold state or having a coil spring additionally attached thereto, said wire in this state being short of elasticity even taking into account the coil spring adding to the elasticity of the wire.

A main object of this invention is to provide a saddle installed elastically to the seat-post of a bicycle and the like, said installation being enabled by a twisted wire consisting of two or preferably more than two wires as resilient as possible.

A second object of this invention is to provide a saddle having a coil spring attached additionally to the above-mentioned twisted wire thereby providing a combined cushioning effect on said saddle.

In order that this invention may be readily understood, an illustration will be given of the preferred embodiments of the invention with regard to the annexed drawing as follows.

Figure 1:
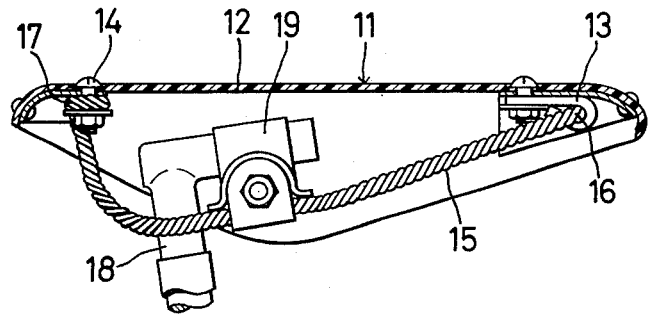
FIG. 1 is a longitudinal side view of a saddle according to the inventive concept in a first embodiment.
Figure 2:
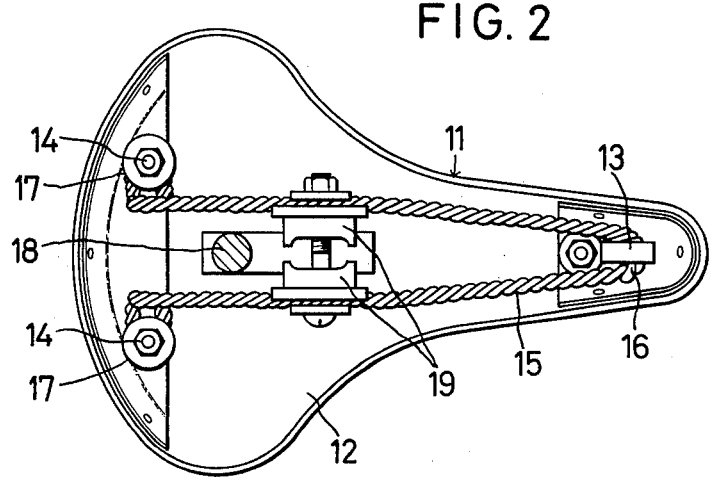
FIG. 2 is a view of the embodiment of FIG. 1 showing the back side thereof.

In the first embodiment as shown in FIG. 1 and 2, numeral 11 designates a saddle comprising a saddle main body 12, a hook-shaped engaging member 13 fitting thereto at the forward tip of the back side thereof and a fastening member 14 consisting of bolts and nuts fixed to said saddle body 12 at both sides of the rear portion also at the back side thereof.

In the case of this embodiment, the saddle body 12 is made of leather, but it may be made of various other materials, for instance, synthetic resin with sponge and the like being laid thereon, said resin and sponge at the peripheral edge thereof being further covered with a sheet also of synthetic resin.

Numeral 15 designates a twisted wire folded at the center in a U-shape and connected at the folded portion 16 to engaging member 13, the folded half portions of the twisted wire 15 extend to the rear from the fold 16 forming an annular portion 17 at each of the rear ends. The wires are bent archedly upwards adjacent to said end portions into annular portion 17. A fastening member 14 is inserted so that the twisted wire 15 is mounted stably on the saddle 12.

The twisted wire 15 is stably mounted to a seat-post 18 through the medium of a pair of fitting members 19 each of which is secured intermediately at each of the half portions of said wire 15.

The saddle of this invention in the first embodiment is constituted as described hereinbefore, wherein the saddle body 12 is mounted on the seatpost 18 by means of a fitting member 19 disposed between the two rows of wire 15. The tensile strength and resiliency of said twisted wire 15 being inevitably more than an untwisted wire of equal material, the tensile strength and resiliency of said wire 15 accordingly providing the saddle with a suitable cushioning effect which is not available with an untwisted wire.

Figure 3:
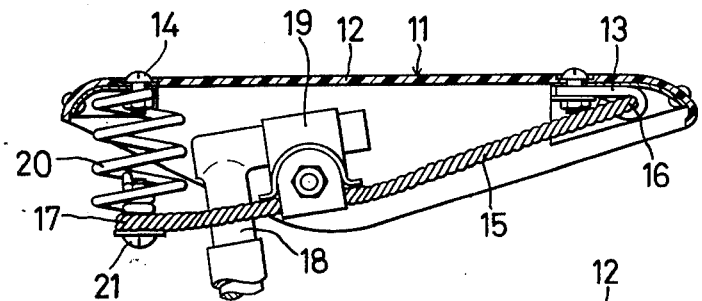
FIG. 3 is a longitudinal section of a saddle in a second embodiment.
Figure 4:
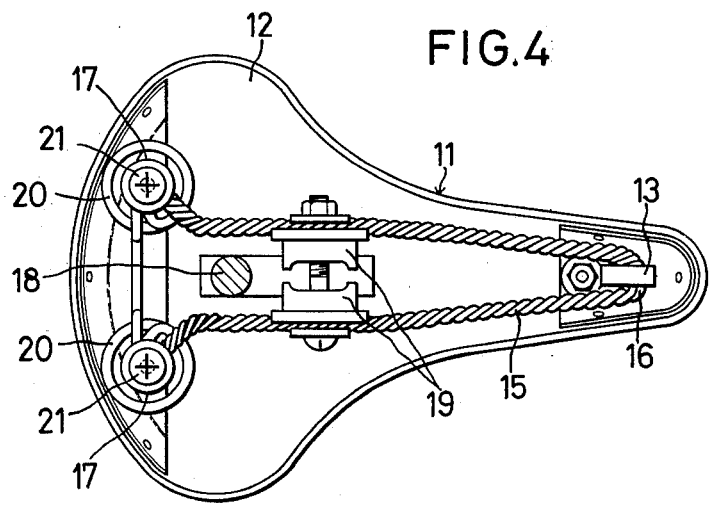
FIG. 4 is a view of the embodiment of FIG. 3 showing also the reverse side thereof.

In the second embodiment shown in FIG. 3 and 4, wherein the same parts as in the first embodiment are designated by same numerals, the twisted wire 15 at both ends is fixed to the rear portion of the saddle body 12 by means of a coil spring 20, said coil spring 20 being fixed at the upper end to the saddle body 12 at both sides of the rear portion at the back side thereof by means of the fastening member 14, both of said coil springs 20 at the upper ends thereof are connected to both ends of twisted wire 15 by means of fastening members 21 consisting of bolts and nuts. In this embodiment, of the twisted wire 15 extends straight back from the folded portion thereof but bending sidewards adjacent the ends thereof thus forming the annular portion 17 to insert a fastening member 21 therein as in the first embodiment.

In this second embodiment, needless to say, the coil springs 20 add to the twisted wire 15 so as to yield a combined cushioning effect that may a stronger cushioning.

What is claimed is:
1. A bicycle or cycle saddle comprising in combination:
   a. a saddle main body (12) of general triangular configuration with a narrow front and tip and a wide rear having a seat side and a bottom side;
   b. a hook-shaped engaging member (13) at the bottom side tip;
   c. a fastening member (14) including nuts and bolts at said wide rear on both sides thereof;
   d. a twisted wire (15) extending in a U-shape between said fastening member (14) and said hook-shaped engaging member (13) the outer ends of said U-shape being held by said fastening member, said U-shape central portion by said hook-shaped engaging member, said twisted wire (15) consisting of at least two very resilient strands uniformly twisted together; and,
   e. a fitting member (19) for coupling said twisted wire (15) at about the center of said U-shape to a bicycle seat post (18).

2. A saddle as claimed in claim 1 including coiled springs between the outer ends of said U-shape and said saddle main body.

* * * * *